United States Patent

Hamdy

[19]

[11] Patent Number: 5,982,758
[45] Date of Patent: Nov. 9, 1999

[54] METHOD AND APPARATUS FOR MERGING NEIGHBOR LISTS IN A CDMA MOBILE TELEPHONE SYSTEM

[76] Inventor: Walid M. Hamdy, 4949 Sandshore Ct., San Diego, Calif. 92130

[21] Appl. No.: 08/800,931

[22] Filed: Feb. 13, 1997

[51] Int. Cl.[6] ...................................................... H04Q 7/00
[52] U.S. Cl. ............................................ 370/331; 370/335
[58] Field of Search ...................................... 370/320, 342, 370/210, 252, 209, 335, 331; 375/334, 356; 455/450

[56] References Cited

U.S. PATENT DOCUMENTS

| | | | |
|---|---|---|---|
| 4,475,010 | 10/1984 | Huensch et al. | 179/2 EB |
| 4,765,753 | 8/1988 | Schmidt | 379/60 |
| 5,101,501 | 3/1992 | Gilhousen et al. | 455/33 |
| 5,164,958 | 11/1992 | Omura | 375/1 |
| 5,179,571 | 1/1993 | Schilling | 375/1 |
| 5,267,261 | 11/1993 | Blakeney, II et al. | 375/1 |
| 5,327,575 | 7/1994 | Menich et al. | 455/33.2 |
| 5,428,816 | 6/1995 | Barnett et al. | 455/33.2 |
| 5,515,401 | 5/1996 | Takenaka | 375/344 |
| 5,737,704 | 4/1998 | Jin | 455/450 |
| 5,799,000 | 8/1998 | Hoole | 370/210 |
| 5,828,661 | 10/1998 | Weaver | 370/331 |

FOREIGN PATENT DOCUMENTS

| | | | |
|---|---|---|---|
| 0421535 | 10/1990 | European Pat. Off. | H04Q 7/04 |
| 9819492 | 5/1998 | WIPO . | |

OTHER PUBLICATIONS

"Mobile Station–Base Station Compatibility Standard for Dual Mode Wideband Spread Spectrum Spread Spectrum Cellular System" TIA/EIA Document/IS–95–A Feb. 27, 1996, pp. 7–183 through 7–184.

"Mobile Station–Base Station Compatibility Standard for Dual Mode Wideband Spread Spectrum Spread Spectrum Cellular System" TIA/EIA Document/IS–95–A Feb. 27, 1996, pp. 7–75 through 7–79.

"Mobile Station–Base Station Compatibility Standard for Dual Mode Wideband Spread Spectrum Spread Spectrum Cellular System" TIA/EIA Document/IS–95–A Feb. 27, 1996, pp. 7–13 through 7–14.

*Primary Examiner*—Chau Nguyen
*Assistant Examiner*—Thinh Vu
*Attorney, Agent, or Firm*—Russell B. Miller; Thomas M. Thibault; Sean English

[57] ABSTRACT

In a code division multiple access (CDMA) spread spectrum cellular communication system in which a mobile station user communicates with another system user via at least one base station, wherein each base station transmits a common pilot signal of a different PN offset with respect to other base stations in said system, a method for merging neighbor lists to account for false indications of signal strength due to topography. The merged list, included as part of the Neighbor List Update Message, is arrived at by first measuring pilot signal strengths and phase delays received by the mobile station and reporting this information to the mobile telephone switching office. At the mobile telephone switching office, pilots whose phase delay indicates a large round trip delay time are ignored in subsequent calculations. Then a neighbor list union is generated as the union of all predetermined neighbor lists corresponding to said received pilot signals. Each member, or base station, in the neighbor list union is operated on by a weighting function which takes into account how often each member is included in each received pilot's predetermined neighbor list and the signal strength of such pilots. The relative weights are then sorted and the highest ranking members form the Neighbor List Update Message, up to a predetermined number of members.

14 Claims, 4 Drawing Sheets

METHOD AND APPARATUS FOR MERGING NEIGHBOR LISTS IN A CDMA MOBILE TELEPHONE SYSTEM

BACKGROUND OF THE INVENTION

I. Field of the Invention

The present application relates to mobile communications systems. More specifically, the present invention relates to a novel and improved method and apparatus for merging predetermined neighbor lists to provide a single list of neighboring base stations to mobile communication units, used to identify possible handoff candidates in a code division multiple access (CDMA) cellular communications system.

II. Description of the Related Art

The use of code division multiple access (CDMA) modulation techniques is but one of several techniques for facilitating communications in which a large number of system users are present. The use of CDMA techniques in a multiple access communication system is disclosed in U.S. Pat. No. 4,901,307, (the '307 patent) entitled "SPREAD SPECTRUM MULTIPLE ACCESS COMMUNICATION SYSTEM USING SATELLITE OR TERRESTRIAL REPEATERS", and U.S. Pat. No. 5,103,459, (the '459 patent) entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

In the '307 and '459 patents, a multiple access technique is disclosed wherein a large number of mobile telephone system users, each having a transceiver, communicate through satellite repeaters or terrestrial base stations (also known as base stations, or cell-sites) using code division multiple access (CDMA) spread spectrum communication signals. The use of CDMA techniques results in a much higher spectral efficiency than can be achieved using other multiple access techniques.

In the exemplary CDMA cellular communication system, each base station transmits a "pilot carrier" signal or, for short, pilot signal. The pilot signal is an unmodulated, direct sequence, spread spectrum signal transmitted at all times by each base station using a common pseudorandom noise (PN) spreading code. The pilot signal allows the mobile stations to obtain initial system synchronization, i.e. timing, in addition to providing a phase reference for coherent demodulation and a reference for signal strength comparisons between base stations for handoff determination.

The pilot signal is transmitted by each base station using the same PN spreading code but with a different PN offset. For example, in the present invention the pilot signal spreading code is of a PN code length of $2^{15}$. In this example there are 511 different offsets from the zero offset, where the offsets are in increments of 64 PN chips. It is this PN offset which allows the pilot signals to be distinguished from one another by the mobile station, resulting in a differentiation between base stations from which they originate. Use of the same pilot signal code allows the mobile station to find system timing synchronization by a single search through all pilot signal code phases. The strongest pilot signals, as determined by a correlation process for each PN offset, are readily identifiable. The identified pilot signal generally corresponds to the pilot signal transmitted by the nearest base station. However, due to topography, this may not always be true. This phenomenon causes problems with present methods of generating the Neighbor List Update Message, described below. Further details of pilot searching techniques are disclosed in U.S. Pat. No. 5,577,022 (the '022 patent) entitled "PILOT SIGNAL SEARCHING TECHNIQUE FOR A CELLULAR COMMUNICATIONS SYSTEM," assigned to the assignee of the present invention and incorporated by reference herein.

Each base station also transmits a sync channel signal which is a modulated, encoded, interleaved, direct sequence, spread spectrum signal used by the mobile stations to acquire additional synchronization, system time, and other overhead control information. Information such as system identification, network identification, a pilot PN sequence offset index, a long code state, current system time along with other time parameters and paging channel data rate are transmitted on the sync channel. It should be noted that the pilot PN sequence offset index identifies an offset value from a zero offset pilot PN sequence. The sync channel signal is despread using the same pilot PN sequence offset as the pilot channel.

Each base station also transmits a paging signal on one or more paging channels. The paging signals are modulated, interleaved, scrambled, direct sequence, spread spectrum signals, which contain control and overhead information. The paging channel is used as such to communicate global and mobile station specific orders, including pages. Overhead messages transmitted on the paging channel include a system parameters message, which contains general system and base station overhead information; an access parameters message, which contains information to be used by the mobile station on an access channel when accessing the system; and a Neighbor List Update Message which identifies to the mobile station the pilot signal PN sequence offsets of neighboring base stations. The sync channel transmitted long code state message is used by the mobile station to descramble the paging channel scrambled signal. Like the sync channel signals, the paging channel signals are spread and despread using the same pilot PN sequence offset as the pilot channel.

Each base station transmits user information to an intended mobile station on a selected one of a plurality of traffic channels. Each mobile station is thus assigned to a unique traffic channel for receiving the mobile station specific information. The traffic channel signals are modulated, interleaved, scrambled, direct sequence, spread spectrum signals transmitted to mobile stations on a respective traffic channel. Information received in the sync channel message is used by the mobile station to descramble the traffic channel scrambled signal.

Further details on the modulation scheme for the various channels of the base station are described in the '459 patent.

In present CDMA systems, the mobile station uses multiple receivers, or diversity reception, to combat the problem of multipath fading. Using a diversity receiver, a mobile station simultaneously demodulates a plurality of signals transmitted by a given base station but which have traveled along different propagation paths. The plurality of demodulated estimates are combined to provide an improved estimate of the data. An example of a diversity receiver is disclosed in U.S. Pat. No. 5,109,390 (the '390 patent) entitled "DIVERSITY RECEIVER IN A CDMA CELLULAR TELEPHONE SYSTEM", assigned to the assignee of the present invention and incorporated by reference herein. Diversity reception in the mobile station also allows it to communicate with more than one base station at a time, such as when the mobile station is transitioning between cells. This is an important concept for soft handoffs, discussed below.

Handoff is a general term used to describe the process whereby communications between a mobile station and a base station controller, also known as a Mobile Telephone Switching Office (MTSO), is continued as the mobile station travels through more than one coverage area or cell. In the conventional cellular telephone system, the handoff scheme implemented is intended to allow a call to continue when a mobile telephone crosses the boundary between two cells. The handoff from one cell to another is initiated when the receiver in the cell base station handling the call notices that the received signal strength from the mobile telephone falls below a predetermined threshold value. A low signal strength indication implies that the mobile telephone is near the cell border. When the signal level falls below the predetermined threshold value, the base station asks the system controller to determine whether a neighboring base station receives the mobile telephone signal with greater signal strength than the current base station.

The system controller in response to the current base station inquiry sends messages to the neighboring base stations with a handoff request. The base stations neighboring the current base station employ special scanning receivers which look for the signal from the mobile telephone on the specified channel. Should one of the neighboring base stations report an adequate signal level to the system controller, then a handoff will be attempted.

Handoff is then initiated when an idle channel from the channel set used in the new base station is selected. A control message is sent to the mobile telephone commanding it to switch from the current channel to the new channel. At the same time, the system controller switches the call from the first base station to the second base station. The above described handoff method is known as a "hard" handoff because there is no overlap in call continuation as the call is transferred from the first base station to the second base station. The switching function of the hard handoff can be considered a "break-before-make" connection.

In contrast is the soft handoff method used in modern CDMA system. Such methods are disclosed in U.S. Pat. No. 5,267,261 (the '261 patent) entitled "MOBILE STATION ASSISTED SOFT HANDOFF IN A CDMA CELLULAR COMMUNICATIONS SYSTEM" and U.S. Pat. No. 5,101,501 (the '501 patent) entitled "METHOD AND SYSTEM OF PROVIDING A SOFT HANDOFF IN COMMUNICATIONS IN A CDMA CELLULAR TELEPHONE SYSTEM", both of which are assigned to the assignee of the present invention and are incorporated by reference herein.

In a mobile assisted soft handoff, the mobile station constantly searches for strong pilot signals. To streamline the process of searching for pilots, four distinct sets of pilot offsets are defined: the Active Set, the Candidate Set, the Neighbor Set, and the Remaining Set. The Active Set identifies the base station(s) or sector(s) through which the mobile station is communicating. The Candidate Set identifies the base station(s) or sector(s) for which the pilots have been received at the mobile station with sufficient signal strength to make them members of the Active Set, but have not been placed in the Active Set by the base station(s). The Neighbor Set identifies the base station(s) or sector(s) which are likely candidates for the establishment of communication with the mobile station. The Remaining Set identifies the base station(s) or sector(s) having all other possible pilot offsets in the current system, excluding those pilot offsets currently in the Active, the Candidate and Neighbor sets.

In system communications between the mobile station and the MTSO, the mobile station is provided a Neighbor List Update Message comprising of PN offsets corresponding to base stations of neighboring cells. In addition, the mobile is provided with a message which identifies at least one pilot corresponding to a base station through which the mobile station is to communicate through. These lists are stored at the mobile station as a Neighbor Set and an Active Set of pilots respectively, and are updated as conditions change.

A search is conducted for determining the signal strength for each pilot identified in the Active, Candidate, Neighbor, and Remaining Set as follows. In one possible search technique, the signal strengths of all pilots in the Active and Candidate Sets are measured first, then the signal strength of the first pilot in the Neighbor Set is evaluated. Then the Active and Candidate Set pilots are re-evaluated, followed by the second pilot in the Neighbor Set. This continues until the last Neighbor pilot is evaluated, then the first pilot of the Remaining Set is evaluated. This cycle continues by a re-evaluation of the Active and Candidate pilots and so on. Further details of the searching process are disclosed in the aforementioned '022 patent.

When communications are established with the mobile station through a base station, the mobile station continues to monitor the signal strength of identifiable pilot signals transmitted from the various neighboring base stations. When a pilot signal exceeds a predetermined threshold level in signal strength, denoted as T_ADD, the pilot is added to the Candidate Set at the mobile station and a message is sent to the MTSO identifying all Active and Candidate pilots, their respective signal strengths and phase delays. This message is called the Pilot Strength Measurement Message. The phase delay information is a measurement used by the MTSO to determine each pilot's Round Trip Delay time with respect to the mobile station. The MTSO, upon receipt of the Pilot Strength Measurement Message, places the pilot that has exceeded T_ADD into the mobile station Active Set and sends a message to the mobile station containing all the pilots to be included in the Active Set through which the mobile station is to communicate. The MTSO also communicates information to the base station corresponding to the new pilot in the Active Set and instructs this base station to establish communications with the mobile station. The mobile station communications are thus routed through all base stations identified by pilots in the mobile station Active Set.

When the mobile station is communicating through multiple base stations, the pilot signal strength of these base stations along with other base stations is monitored by the mobile station as described above. Should a pilot signal corresponding to a pilot of the Active Set drop below a predetermined threshold, denoted as T_DROP, for a predetermined period of time, denoted as T_TDROP, the mobile station generates and transmits the Pilot Strength Measurement Message to report the event. The MTSO receives this message via at least one of the base stations through which the mobile station is communicating. The MTSO may then decide to terminate communications through the base station whose pilot signal strength as measured at the mobile station is below the threshold level.

The MTSO upon deciding to terminate communications through a base station generates a new message identifying the pilots of the Active Set to which the mobile station is to communicate through. In this message which identifies pilots of the Active Set, the pilot of the base station to which communications with the mobile station are to be terminated is not identified. The MTSO also communicates information to the base station not identified in the Active Set to terminate communications with the mobile station. The mobile station, upon receiving the message identifying pilots of the Active Set, discontinues processing signals from the base station whose pilot is no longer in the Active Set. The mobile station communications are thus routed only through base stations identified by pilots in the mobile station's Active Set. In the case where there were previously more than one pilot identified in the Active Set and now only one, the mobile station communicates only to the one base station corresponding to the pilot identified in the mobile station Active Set.

Since the mobile station is communicating with the MTSO via at least one base station at all times throughout the handoff, there is no interruption in communications between them. A soft handoff in communications provides significant benefits in its inherent "make before break" communication over conventional "break before make" techniques employed in other cellular communication systems.

Soft handoffs are far less likely to drop calls than are hard handoffs because a phenomenon referred to as "ping-ponging" is greatly reduced. "Ping-ponging" occurs when the mobile telephone is near the border between two cells. In this situation the signal level tends to fluctuate at both base stations. This signal level fluctuation results in a situation in which repeated requests are made to hand the call back and forth between the two base stations. Such additional unnecessary handoff requests increase the possibility of the mobile station incorrectly hearing the channel switch command or failing to hear the command at all. Furthermore, this situation raises the possibility that the call will be discontinued if it is inadvertently transferred to a cell in which all channels are currently in use and thus unavailable for accepting the handoff.

The soft handoff technique described above can also be used to provide continued communication as a mobile station traverses between different sectors of a single base station. Such a method is disclosed in U.S. patent application Ser. No. 08/405,611, filed Mar. 13, 1995 entitled "METHOD AND APPARATUS FOR PERFORMING HANDOFF BETWEEN SECTORS OF A COMMON BASE STATION," assigned to the assignee of the present invention and incorporated by reference herein.

Current methods of generating the Neighbor List Update Message, while reasonable for small systems, are often problematic when used in large metropolitan areas, because they generate a very large Neighbor Set. For example, the Neighbor List Update Message in some systems is generated from the union of neighbor lists for each pilot signal in the mobile station's Active Set. The Neighbor List Update Message is generated the same way whether the mobile station is in soft handoff or not. The union of neighbors from the Active pilots can yield a very large Neighbor Set which imposes a search burden on the mobile station. That is, the mobile station can only search a limited number of pilot signals within a given time frame. The number of pilots in the Neighbor List Update Message is limited to a predetermined number, such as twenty.

Another problem with present methods of generating the Neighbor List Update Message is false indications of pilot strength due to topography. For example, a mobile station may detect a strong pilot signal from a base station which is located many miles away only because that base station is located on top of a mountain. Or a mobile station may detect a weak pilot signal from a nearby base station only because the mobile station happens to be in a valley at the time the nearby base station pilot energy is measured. In some systems, the Neighbor List Update Message is generated by simply selecting the first pilot signal identified in the Pilot Signal Measurement Message and placing all of its corresponding neighbors into the Neighbor List Update Message first. Then the next pilot's neighbors are placed in the List and so on. Using this method, far away base stations may be included in the Neighbor List Update Message though unsuitable for handoff, while nearby base stations may be excluded, though more suitable for handoff.

What is needed is a better method to generate the Neighbor List Update Message in order to find the most likely candidates for handoff. The method should prioritize the list of neighboring base stations and solve the problem of false pilot signal strengths due to topography.

SUMMARY OF THE INVENTION

The present invention provides a substantial improvement over present methods for finding suitable base station candidates for handoff. A Neighbor List Update Message is generated by the MTSO as a function of the signal strength of Active pilot signals and the frequency that a potential candidate for the Neighbor List is included as an Active pilot neighbor. In addition, the Round Trip Delay time of each Active pilot is evaluated so that neighbors of far away base stations will not be considered for inclusion in the Neighbor List Update Message.

The present invention is described herein in an exemplary embodiment as a cellular communication system which uses code division multiple access (CDMA) modulation techniques. In the system, each base station transmits a pilot signal of a common PN spreading code, offset in phase from pilot signals of other base stations.

The mobile station constantly monitors for strong pilot signals regardless of whether it is in active communication mode or in idle mode awaiting direction from the MTSO. The mobile station transmits a Pilot Strength Measurement Message containing a list of all pilots in the Active and Candidate Set, their respective signal strengths, and associated phase delays when any measured pilot becomes particularly strong or weak. At other times, the mobile station is asked occasionally by the Mobile Telephone Switching Office (MTSO) to provide the Pilot Strength Measurement Message.

The Neighbor List Update Message is generated at the MTSO using the Active Set pilots. In an alternative embodiment, the Candidate Set pilots may also be used. Consequently, the term "Active/Candidate" will be used to describe either embodiment herein.

At the MTSO, a fixed, predetermined neighbor list for each Active/Candidate pilot received from the mobile station is retrieved from memory. Each received pilot's phase delay is evaluated to determine its Round Trip Delay time and whether the Round Trip Delay time has exceeded a predetermined threshold, indicating a far away base station. If the threshold has been exceeded, that pilot's neighbors are not considered for inclusion into the Neighbor List Update Message.

After the Round Trip Delay evaluation, a neighbor list union is created by forming the union of all predetermined neighbor lists associated with the identified Active/Candidate pilot signals. Each neighboring base station, or member, in the neighbor list union is operated on by a calculation which assigns a weighted value to it in order to identify the most likely candidates for handoff. The weighted value is proportional to the number of Active/

Candidate pilots that include that particular member in its corresponding predetermined neighbor list as well as the signal strengths of those Active/Candidate pilots. The calculation is configurable to achieve the desired performance in each communication system. Once all of the members in the neighbor list union have been evaluated, they are ranked in order according to their weights and a predetermined number of pilots are provided to the mobile station in the Neighbor List Update Message. The mobile then uses the Neighbor List Update Message to search for pilot signals strong enough to communicate through.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
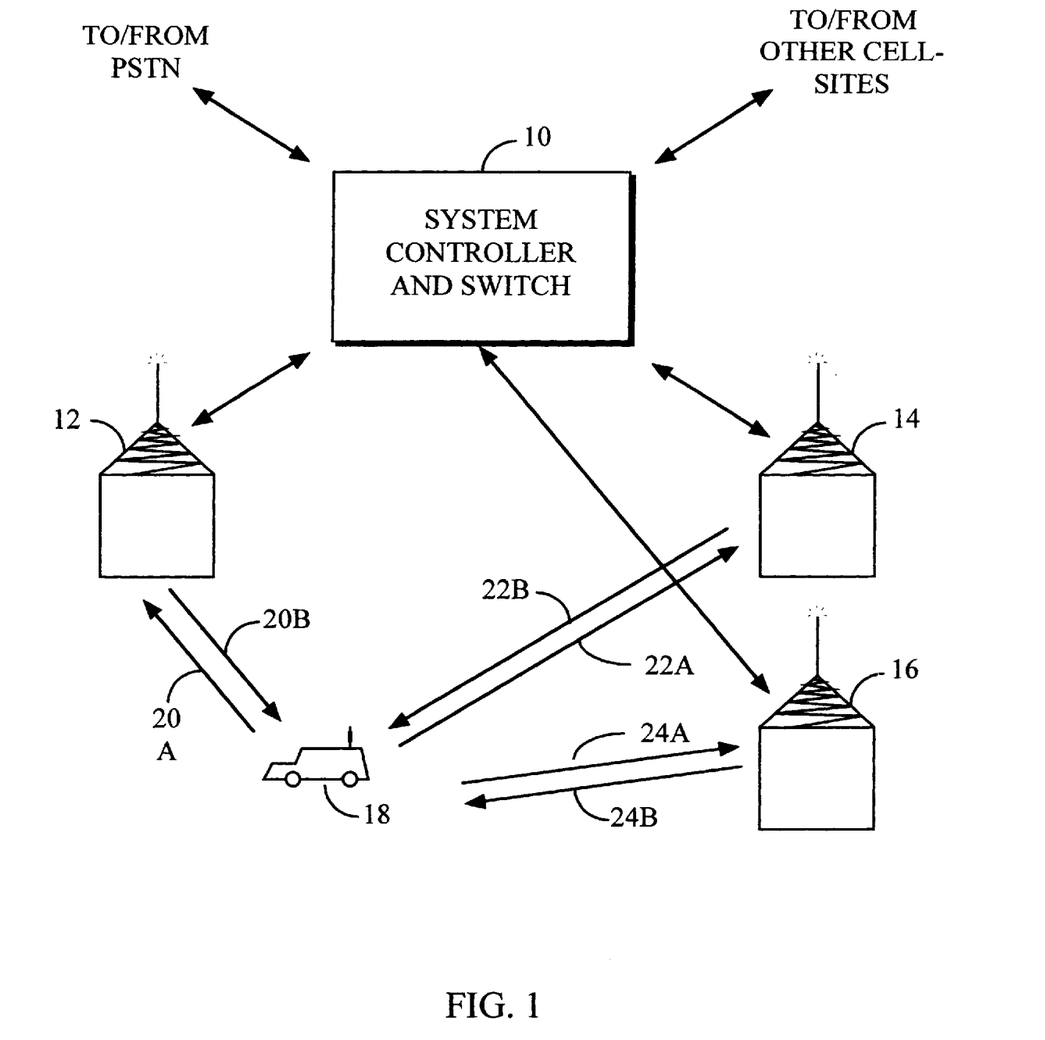
FIG. 1 is a schematic overview of an exemplary CDMA cellular telephone system in accordance with the present invention.

An exemplary illustration of a cellular telephone system, which may as easily be shown as a personal communication system (PCS), in which the present invention is embodied is provided in FIG. 1. In the exemplary embodiment, the system illustrated in FIG. 1 utilizes CDMA modulation techniques in communication between the system mobile stations or mobile telephones, and the base stations. Cellular systems in large cities may have hundreds of base stations serving hundreds of thousands of mobile telephones. Universal frequency reuse makes the use of CDMA techniques amenable to increases in user capacity in large systems as compared to conventional FM modulation cellular systems.

In FIG. 1, system controller and switch 10, also referred to as mobile telephone switching office (MTSO) or system controller, typically includes interface and processing circuitry for providing system control to the base stations. System controller 10 also controls the routing of telephone calls from the public switched telephone network (PSTN) to the appropriate base station for transmission to the appropriate mobile station. System controller 10 also controls the routing of calls from the mobile stations, via at least one base station to the PSTN. System controller 10 may direct calls between mobile users via the appropriate base station(s) since such mobile stations do not typically communicate directly with one another.

System controller 10 may be coupled to the base stations by various means such as dedicated telephone lines, optical fiber links or by microwave communication links. In FIG. 1, three such exemplary base stations, 12, 14 and 16 along with an exemplary mobile station 18, which includes a cellular telephone, are illustrated. Arrows 20a–20b define the forward and reverse communication links between base station 12 and mobile station 18. Arrows 22a–22b define the forward and reverse communication links between base station 14 and mobile station 18. Similarly, arrows 24a–24b define the forward and reverse communication links between base station 16 and mobile station 18.

The base station service areas or cells are designed in geographic shapes such that the mobile station will normally be closest to one base station. When the mobile station is idle, i.e. no calls in progress, the mobile station constantly monitors the pilot signal transmissions from each nearby base station. As illustrated in FIG. 1 the pilot signals are respectively transmitted to mobile station 18 by base stations 12, 14 and 16 upon communication links 20b, 22b and 24b, respectively. The mobile station then determines which cell it is in by comparing pilot signal strength transmitted from these particular base stations.

In the example illustrated in FIG. 1, mobile station 18 may be considered closest to base station 16. When mobile station 18 initiates a call, a control message is transmitted to base station 16. Base station 16 upon receiving the call request message, signals system controller 10 and transfers the call number. System controller 10 then connects the call through the PSTN to the intended recipient.

Should a call be initiated within the PSTN, system controller 10 transmits the call information to all the base stations in the area. The base stations in return transmit a paging message to the intended recipient of mobile station. When the mobile station receives such a page message, it responds with a control message that is transmitted to the base station that the mobile station is in communication with. This control message signals the system controller that this particular base station is in communication with the mobile station. System controller 10 then routes the call through this base station to the mobile station.

Should mobile station 18 move out of the coverage area of base station 16, an attempt is made to continue the call by routing the call through another base station. There are two different methods of initiating the handoff of the call: base station initiated handoff and mobile initiated handoff. Both of these techniques are described in detail in the aforementioned '501 and '261 patents.

Figure 2:
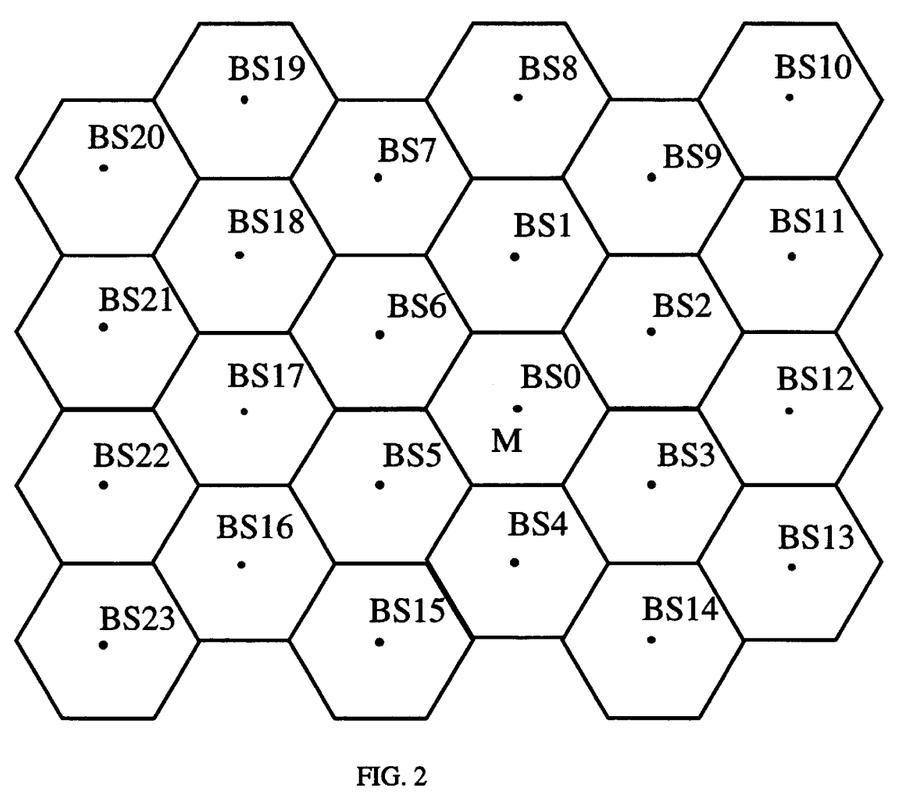
FIG. 2 is a diagram of cell-site coverage in an exemplary CDMA cellular telephone system.

FIG. 2 illustrates the cell site coverage in a typical cellular system. Each cell, or coverage area, is designated by a reference BSx, where x identifies the particular cell. The mobile station is identified by the 'M' in cell BS0. Upon initial power-up, the mobile station searches for the first pilot signal strong enough to communicate through. In this example, the mobile receives its strongest pilot signal from base station 0, located in cell BS0, due to its proximity to that cell site. In addition, it also receives a strong signal from cell site 20, due to that cell site's location on top of a mountain. The mobile station then communicates the identified strong pilot signals and their corresponding signal strengths and phase delay times to the MTSO through the cell-site with the greatest signal strength, in this case cell site 0. The MTSO determines that the mobile station should communicate through both base station BS0 and BS20 and therefore informs the mobile station to include both of these pilots in the Active Set.

The MTSO, upon receiving the initial pilot information, generates the Neighbor List Update Message by first evaluating each Active/Candidate pilot signal for a Round Trip Delay time greater than a predetermined threshold, in the exemplary embodiment, called RTD_MAX. The Round Trip Delay is proportional to the distance between the mobile station and a particular cell site. The neighboring cell sites to base station BS20 are no longer considered for inclusion in the Neighbor List Update Message in this example because BS20's Round Trip Delay time exceeds the predetermined threshold, i.e., it is located too far away from the mobile station. In the prior art, the neighboring base stations to BS20 would be included in the Neighbor List Update Message. The inclusion of these base stations would be improper because they would not necessarily provide strong pilot signals to the mobile unit suitable for handoff. In fact, the base stations surrounding BS20 would most likely be poor choices for handoff, when base stations BS1 through BS6 would most likely be much better candidates. It should be understood that although BS20's surrounding base stations would not be considered for handoff in the present invention, BS20 will remain in the Active Set because of its strong pilot signal.

The MTSO now generates the Neighbor List Update Message by creating the union of predetermined neighbor lists of all Active/Candidate pilots identified by the mobile station, in this case Active pilot BS0 only. Referring again to FIG. 2, the union of predetermined neighbor lists is simply base stations BS1 through BS6. The list is prioritized in accordance with a predetermined function, discussed more fully later herein, then sent to the mobile station as the Neighbor List Update Message from which the mobile station searches for strong pilot signals.

A more interesting example of Neighbor List generation can be shown as the mobile station moves from cell 0 to cell 6. As in the previous example, the mobile station is communicating through base station BS0, whose pilot signal is contained within the Active Set. The mobile station is also receiving a strong signal from base station BS20, again due to that base station's location on top of a mountain, having its corresponding pilot signal also belonging to the Active Set. The mobile station is searching through pilot offsets corresponding to base stations BS1 through BS6 to determine if any signals are becoming stronger, in accordance with the previously generated Neighbor List Update Message.

As the mobile station approaches base station BS6, the pilot signal from that base station becomes gradually stronger, until it crosses a predetermined threshold, called T_ADD in the exemplary embodiment. The mobile station places that pilot signal into the Candidate Set and reports the signal strengths and phase delay times of all Active and Candidate Set pilots to the MTSO upon this event. The MTSO immediately places the pilot from base station BS6 into the Active Set. Then the MTSO begins generating a new Neighbor List Update Message by first evaluating each Active/Candidate pilot's reported phase delay time to determine the corresponding Round Trip Delay time. In this example, base station BS20's Round Trip Delay exceeds a predetermined threshold due to its far-away location and is dropped from further consideration for the generation of the Neighbor List Update Message, but remains in the Active Set due to its pilot strength.

Next, the pilot signals from base stations BS0 and BS6 are evaluated. A fixed, predetermined neighbor list is retrieved from memory for each of these base stations. As shown in FIG. 2, BS0's predetermined neighbor list is comprised of neighbors BS1 through BS6 and BS6's predetermined neighbor list is comprised of neighbors BS0, BS1, BS5, BS7, BS17 and BS18. The union of these two lists produces a neighbor list union consisting of base stations BS0, BS1, BS2, BS3, BS4, BS5, BS6, BS7, BS17, and BS18. Each member of this union is evaluated by performing a weighting calculation dependent on how many reported Active/Candidate pilots can consider that particular member a neighbor in its predetermined neighbor list and the strength of the pilot signal. For instance, member BS5 is found in the predetermined neighbor list of cell site BS6 as well as BS0. Because BS5 is found in more than one predetermined neighbor list, it will receive a higher weight than if it were found in only one predetermined neighbor list. After each member of the neighbor list union is evaluated, it is sorted by weight and the highest ranking members are sent to the mobile station in the Neighbor List Update Message. Further details of the weighting process are provided below.

The mobile station continues to scan pilot offsets in accordance with the Neighbor List Update Message to determine if any pilots are becoming strong enough to be considered for handoff. As the mobile station enters cell 6, the pilot strength from base station BS0 eventually drops below a predetermined threshold, in the exemplary embodiment called T_DROP, where the mobile station alerts the MTSO to this event. The mobile station also sends pilot signal strengths and phase delay times of all pilots in the Active and Candidate Sets. A new Neighbor List Update Message is calculated in accordance with the procedure explained above. The MTSO will direct the mobile station to remove the pilot corresponding to base station BS0 from the Active Set and into the Neighbor Set. The MTSO at that point directs the mobile station to stop communicating with base station BS0, completing the handoff.

Figure 3:
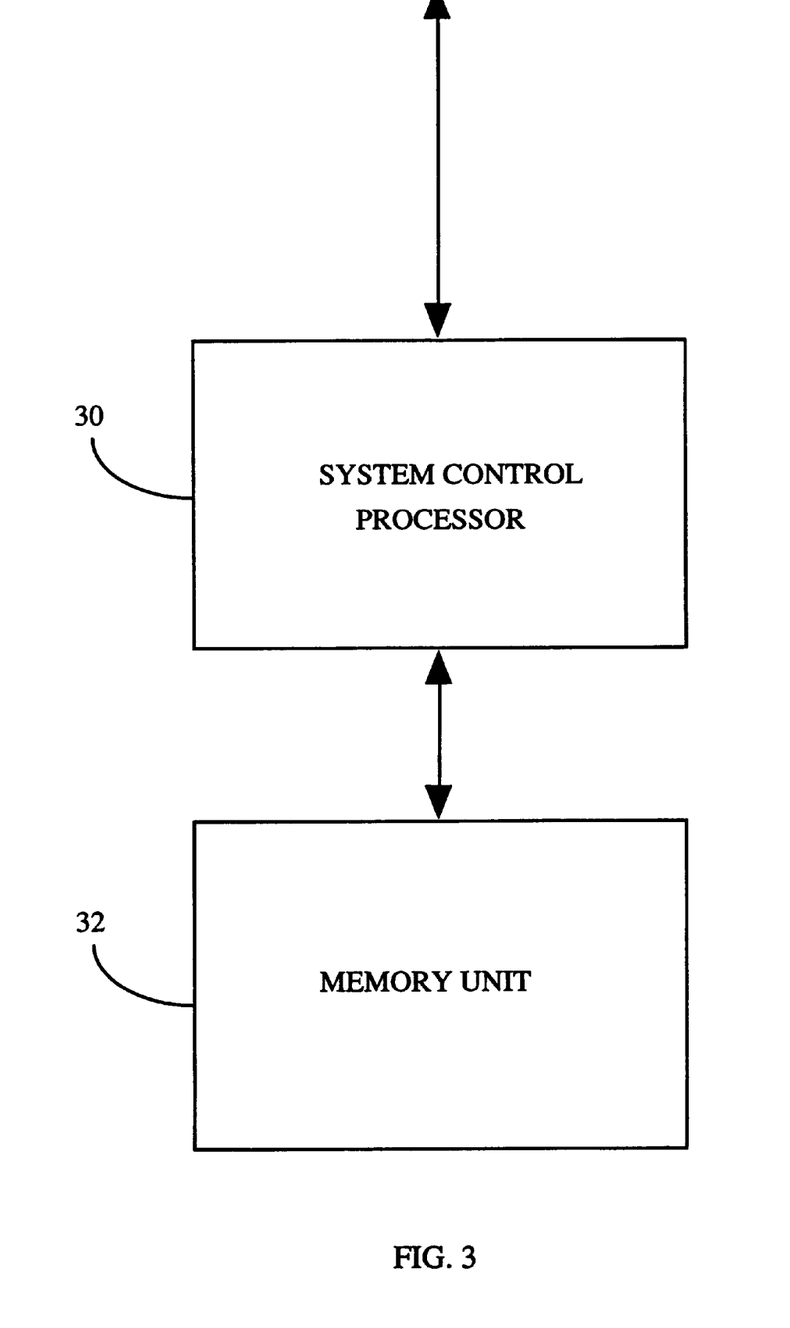
FIG. 3 is a block diagram of a mobile telephone switching office.

FIG. 3 illustrates in block diagram form the equipment utilized in the MTSO. The MTSO typically includes a system controller or system control processor 100, digital switch 102, diversity combiner 104, digital vocoder 106 and digital switch 108. Although not illustrated, additional diversity combiners and digital vocoders are coupled between digital switches 102 and 108. Each of these blocks are discussed in detail in aforementioned U.S. Pat. No. 5,267,261.

Of particular importance to the present invention is system control processor 100. Generally, decisions regarding handoff are made by system control processor 100 with the base station relaying them on to the mobile station.

System control processor 100 generates various messages for relay by the base station to the mobile station. In the exemplary embodiment, one such message is the System Parameters Message, communicated on a paging channel by the base station, which contains default values for various handoff parameters. Among these parameters are the Handoff Detection Threshold (T_ADD) and the Handoff Drop Threshold 15 (T_DROP), which are fully described in the aforementioned '261 patent. The message containing these parameter values is demodulated and decoded, and then stored in the mobile station control processor.

Other messages generated by the system control processor and communicated via at least one base station to the mobile station are the Pilot Measurement Request Order, the Handoff Direction Message, and the Neighbor List Update Message. These messages are demodulated and decoded, and then provided to the mobile station control processor. The mobile station acts upon the each of these messages in support of a handoff as discussed in the aforementioned '261 patent.

Of particular importance to the present invention is the Pilot Measurement Request Order and the Neighbor List Update Message. In response to the Pilot Measurement Request Order the mobile station reports the current estimate of the pilot strengths of all the pilots in its Active Set and Candidate Set, as well as each pilot's phase delay time. This message is referred to as the Pilot Strength Measurement Message. The Pilot Strength Measurement Message is transmitted to the cell-site(s) corresponding to the pilot(s) identified in the Active Set and then on to System Controller and Switch 10.

Referring again to FIG. 3, the pilot identification information and corresponding signal strengths are received at System Controller and Switch 10 and processed using system control processor 100. Each pilot in the Active/Candidate Set is first checked to see if its associated round trip delay (RTD) is greater than a pre-determined threshold, in the exemplary embodiment, RTD_MAX. If so, this indicates that neighbors of the base station associated with this pilot are too far away from the mobile station to be considered for inclusion to the Neighbor List Update Message. Such pilots receive no further consideration in determining the makeup of the Neighbor List Update Message.

Memory Unit 110 contains a list of all cell-sites within the communications network and a fixed, predetermined neighbor list for each cell-site in the system. For example, referring to FIG. 2, cell-site BS0's neighbor list would include cell-sites BS1 through BS6. For each Active/Candidate Set pilot received by MTSO 10, the corresponding predetermined neighbor list is provided to system control processor 100 where it is processed in order to best determine which cell-sites to consider for possible handoff.

Figure 4:
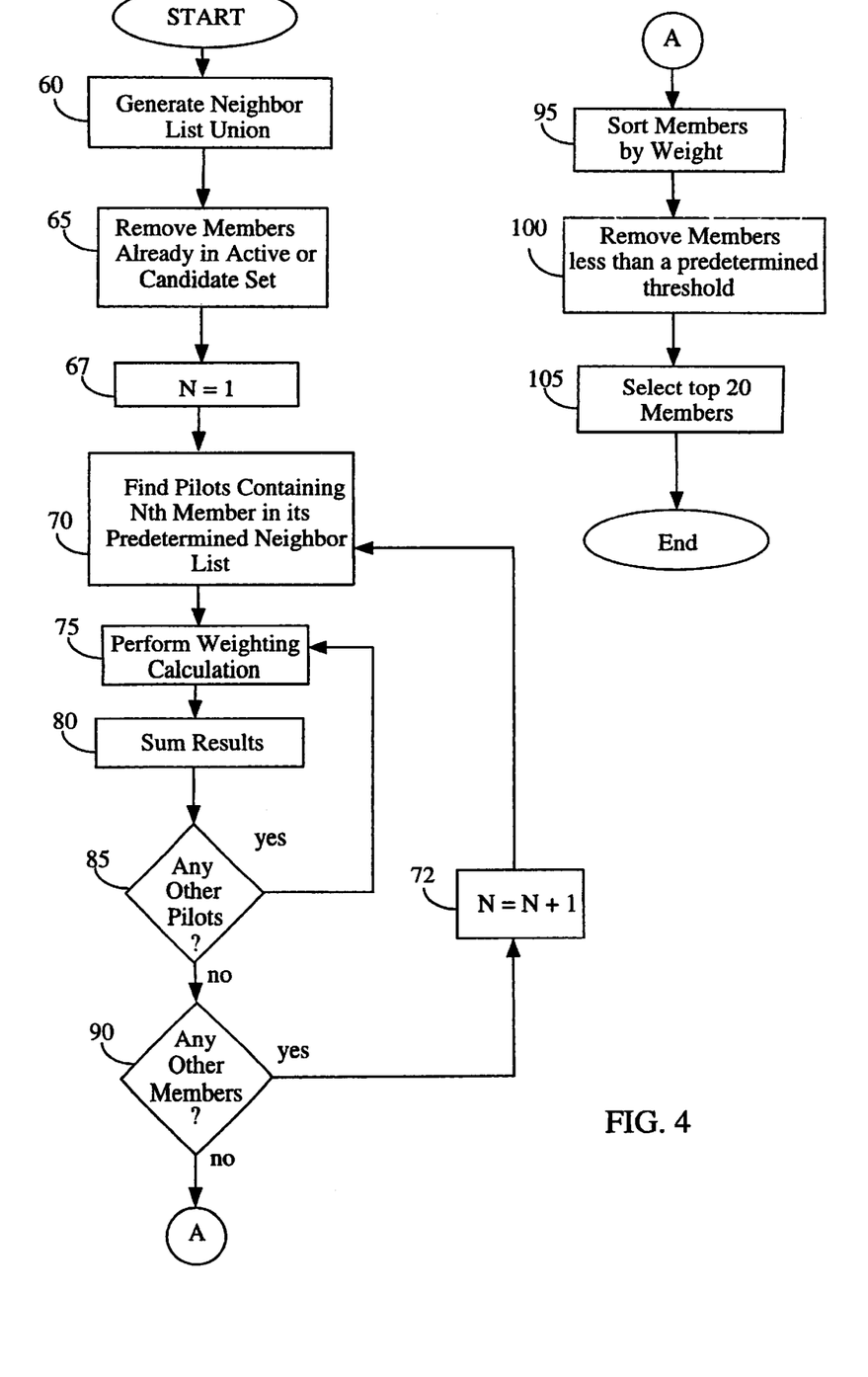
FIG. 4 is a flow diagram illustrating the method of assigning weights to the initial neighbor list.

Processing is done in accordance with the flowchart shown in FIG. 4. First, a neighbor list union is generated as the union of base stations from the predetermined neighbor lists of Active/Candidate pilots provided to system control processor 100, shown in block 60. For instance, if a first Active pilot signal corresponds to a predetermined neighbor list containing base stations BS1, BS2, BS3, BS5, BS7, and BS8 and a second Active pilot signal corresponds to a predetermined neighbor list containing base stations BS2, BS4, BS5, BS6, and BS8, the union of these two neighbor lists would be a neighbor list union containing base stations BS1, BS2, BS3, BS4, BS5, BS6, BS7, and BS8.

Block 65 then removes any members in the neighbor list union that are currently in the Active or Candidate Sets. Block 67 sets variable N equal to 1, which represents the Nth member in the neighbor list union to be evaluated. In block 70, the first member in the neighbor list union is compared to the predetermined neighbor list corresponding to the first Active/Candidate Set pilot received by the MTSO to determine whether the member under consideration is contained within that list. Continuing with the example given, member BS1 would be used to find the first predetermined neighbor list in which it is a member. In this case, member BS1 is found in the predetermined neighbor list corresponding to the first Active pilot.

Next, a calculation is performed in block 75 which assigns a weight to member BS1 proportional to the signal strength of the first Active pilot. For example, the weight could be calculated as follows:

$$\text{weight}=f(x)=\max((\text{strength of pilot})-T\_BASE, 0) \quad (1)$$

where, in the exemplary embodiment, T_BASE is a configurable, predetermined threshold level in dB based on other handoff parameters, and is configurable to meet system requirements. Other calculations may be used in place of the one shown above. For example, the following alternative weighting function could be used:

$$\text{weight}=f(x)=10^{(\text{strength of pilot}/10)} \quad (2)$$

This calculation results in the weight to be equal to the combined signal strength in linear units whereas the former calculation results in the weight to be in dB. The calculation shown in equation (2) above results in strong Active/Candidate pilot neighbors dominating other weaker Active/Candidate pilots whereas the calculation in equation (1) results in a more even distribution of neighbors when a single, strong pilot is encountered. It should be understood that other calculations can be used depending on the system configuration; the above two weighting functions are shown as examples only.

The results of the above calculation are stored in memory unit 110 and a new calculation is performed if the current member under consideration is included in another Active/Candidate pilot's predetermined neighbor list, shown in block 85. If so, then a new calculation is performed using the signal strength of the second pilot. The result of this and any subsequent calculations are added to the first calculation, shown in block 80. If there are no more predetermined neighbor lists that contain the initial member, the final summation is stored in memory unit 110. Block 90 checks to see if there are other members in the neighbor list union to be evaluated and if so, variable N is incremented in block 72 to indicated the next member in the neighbor list union to be evaluated. Blocks 70 through 85 repeat the just described weighting function, storing respective final sums for each member in memory unit 110.

After each member of the neighbor list union has been evaluated, the results are sorted by weight in descending order, shown in block 95. Next, in block 100, those members whose weight is not greater than a predetermined minimum threshold are removed from the List This avoids including marginally acceptable pilots in the Neighbor List Update Message. Finally, in block 105, in the exemplary embodiment, the top twenty members are chosen to be included in the Neighbor List Update Message that is transmitted to the mobile station.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

I claim:

1. In a code division multiple access (CDMA) spread spectrum cellular communication system in which a mobile station user communicates with another system user via at least one base station and a mobile telephone switching office, wherein each base station transmits a common pilot signal of a different PN offset with respect to other base stations in said system, a method for providing a Neighbor List Update Message to said mobile station for aiding in the search for possible handoff candidates, comprising the steps of:

measuring, at said mobile station, the signal strength of base station transmitted pilot signals and corresponding round trip delays;

communicating said pilot signal strengths and said round trip delays corresponding to said PN offsets from said mobile station via said at least one base station to said mobile telephone switching office;

generating said Neighbor List Update Message to said mobile station as a function of said pilot signal strength, and said round trip delays; and     communicating said Neighbor List Update Message to said mobile station.

2. The method of claim 1 wherein the generating step further comprises the steps of:

retrieving, from a memory unit, a fixed, predetermined neighbor list for each of said pilot signals that said mobile station is presently communicating with and whose corresponding round trip delay time does not exceed a predetermined threshold;

generating the union of neighboring base stations from said fixed, predetermined neighbor lists;

removing from said union any member of said union which is a member of the Active or Candidate Set;

identifying, for each member of said union, said received pilot signals which include said member in their respective fixed, predetermined neighbor lists;

calculating, for each of said members, a relative signal strength based upon the number and signal strength of said received pilot signals which include said member in their respective fixed, predetermined neighbor lists;

sorting said members based upon said relative signal strength; and selecting said members with the highest relative signal strengths to be included in said Neighbor List Update Message provided to said mobile station.

3. The method of claim 2 wherein the step of calculating relative signal strength for each of said members is done in accordance with the equation:

$$W_k = \sum_{\{j\}} \begin{cases} f(P_j) & ; RTD_j < RTD\_MAX \\ 0 & ; RTD_j > RTD\_MAX \end{cases}$$

where Pj is equal to the signal strength of said received pilot j, f(Pj) is a function of the signal strength of said received pilot j, RTDj is the round trip delay of said pilot j, Wk is the relative signal strength of member k in said union, RTD_MAX is a pre-determined maximum round trip delay threshold, and {j} is the set of received pilots which include member k in their respective unique, predetermined list of neighboring base stations.

4. The method of claim 3 wherein the function f(Pj) is calculated in accordance with the equation:

$$f(Pj)=\max(Pj-T\_BASE,0); f(Pj)>0$$

where Pj is the signal strength of received pilot j and T_BASE is a pre-determined minimum power threshold.

5. The method of claim 3 wherein the function f(Pj) is calculated in accordance with the equation:

$$f(Pj)=10^{(Pj/10)}$$

where Pj is the signal strength of pilot j.

6. The method of claim 2 wherein the selecting step further comprises the steps of:

removing from said union any of said members whose respective relative signal strength is not greater than a predetermined minimal threshold; and removing from said union members with the lowest relative signal strength, leaving a predetermined number of members.

7. The method of claim 6 wherein said predetermined number of members is equal to at most twenty.

8. In a code division multiple access (CDMA) spread spectrum cellular communication system in which a mobile station user communicates with another system user via at least one base station and a mobile telephone switching office, wherein each base station transmits a common pilot signal of a different PN offset with respect to other base stations in said system, an apparatus for providing a Neighbor List Update Message to said mobile station comprising:

pilot strength measurement means, located within said mobile station, for determining pilot signal strength of received pilot signals;

pilot phase measurement means, located within said mobile station, for determining the phase delay of each of said received pilot signals to be used by said mobile telephone switching office to determine corresponding round trip delay times;

first communication means, located within said mobile station, for transmitting said pilot PN offset information, said corresponding pilot signal strength information, and said corresponding pilot phase information of each of said received pilot signals to said mobile telephone switching office and for receiving said Neighbor List Update Message;

memory means, at said mobile telephone switching office, for storing a fixed, predetermined neighbor list for each base station within said communication system;

second communication means, located within said mobile telephone switching office, for receiving said pilot offset information, said corresponding pilot signal strength information, and said pilot phase information of each of said received pilot signals from said mobile station and for transmitting said Neighbor List Update Message to said mobile station; and processing means for generating said Neighbor List Update Message as a function of said pilot signal strength, a frequency that a potential candidate for a Neighbor List is included as an Active pilot signal, and said phase delay.

9. The apparatus of claim 8 wherein the processing means further comprise:

means for retrieving from a memory unit, a fixed, predetermined neighbor list for each of said pilot signals that said mobile station is presently communicating with and whose corresponding round trip delay time does not exceed a predetermined threshold;

means for generating the union of neighboring base stations from said fixed, predetermined neighbor lists;

means for removing from said union any member of said union which is a member of the Active or Candidate Set;

means for identifying for each member of said union, said received pilot signals which include said member in their respective fixed, predetermined neighbor lists;

means for calculating for each of said members, a relative signal strength based upon the number and signal strength of said received pilot signals which include said member in their respective fixed, predetermined neighbor lists;

means for sorting said members based upon said relative signal strength; and means for selecting said members with the highest relative signal strengths to be included in said Neighbor List Update Message provided to said mobile station.

10. The apparatus of claim 9 wherein the means for calculating relative signal strength for each of said members operate in accordance with the equation:

$$W_k = \sum_{\{j\}} \begin{cases} f(P_j) & ; RTD_j < RTD\_MAX \\ 0 & ; RTD_j > RTD\_MAX \end{cases}$$

where Pj is equal to the signal strength of said received pilot j, f(Pj) is a function of the signal strength of said received pilot j, RTDj is the round trip delay of said pilot j, Wk is the relative signal strength of member k in said union, RTD__MAX is a pre-determined maximum round trip delay threshold, and {j} is the set of received pilots which include member k in their respective unique, predetermined list of neighboring base stations.

11. The apparatus of claim 10 wherein the means for calculating the function f(Pj) operate in accordance with the equation:

$$f(Pj) = \max(Pj - T\_BASE, 0); f(Pj) > 0$$

where Pj is the signal strength of received pilot j and T__BASE is a predetermined minimum power threshold.

12. The apparatus of claim 10 wherein the means for calculating the function f(Pj) operate in accordance with the equation:

$$f(Pj) = 10^{(Pj/10)}$$

where Pj is the signal strength of pilot j.

13. The apparatus of claim 9 wherein the selecting means further comprise:

means for removing from said union any of said members whose respective relative signal strength is not greater than a predetermined minimal threshold; and means for removing from said union members with the lowest relative signal strength, leaving a predetermined number of members.

14. The apparatus of claim 13 wherein said predetermined number of members is equal to at most twenty.

* * * * *